(12) United States Patent
Everson et al.

(10) Patent No.: US 9,943,913 B2
(45) Date of Patent: Apr. 17, 2018

(54) FASTENER REMOVAL AID DEVICES

(71) Applicant: The Boeing Company, Seal Beach, CA (US)

(72) Inventors: Matthew K. Everson, Thorofare, NJ (US); Daniel P. Glavin, Perkiomenville, PA (US); Matthew F. Schrader, Glenolden, PA (US); Matthew A. Carney, Ridley Park, PA (US)

(73) Assignee: The Boeing Company, Chicago, IL (US)

( * ) Notice: Subject to any disclaimer, the term of this patent is extended or adjusted under 35 U.S.C. 154(b) by 474 days.

(21) Appl. No.: 14/302,063

(22) Filed: Jun. 11, 2014

(65) Prior Publication Data

US 2015/0360297 A1      Dec. 17, 2015

(51) Int. Cl.
*B23B 47/28* (2006.01)
*B21J 15/50* (2006.01)

(52) U.S. Cl.
CPC ............ *B23B 47/284* (2013.01); *B21J 15/50* (2013.01); *Y10T 408/03* (2015.01); *Y10T 408/569* (2015.01); *Y10T 408/98* (2015.01)

(58) Field of Classification Search
CPC ........ B23B 47/28; B23B 47/284; B21J 15/50; Y10T 408/569
See application file for complete search history.

(56) References Cited

U.S. PATENT DOCUMENTS

| | | | | |
|---|---|---|---|---|
| 2,296,087 A * | 9/1942 | Burns, Jr. | ............... | B21J 15/50 408/81 |
| 2,383,953 A * | 9/1945 | Beard | ................... | B23B 47/284 29/426.5 |
| 2,576,786 A * | 11/1951 | Gray | ..................... | B23B 47/284 408/112 |
| 2,686,447 A * | 8/1954 | Vock | ...................... | B25B 27/18 29/240 |
| 5,228,811 A * | 7/1993 | Potter | ................... | B23B 47/284 408/112 |
| 5,388,933 A * | 2/1995 | Dunbar | ................ | B23B 47/284 408/115 B |

(Continued)

OTHER PUBLICATIONS http://www.browntool.com/Default.aspx?tabid=255&txtSearch=removable&List=18&SortField=ProductName%2CProductNumber&ProductID=154; 2 pages, Jun. 11, 2014.

*Primary Examiner* — Eric A Gates
(74) *Attorney, Agent, or Firm* — Francisco A. Rubio-Campos; Apogee Law Group P.C.

(57) ABSTRACT

A fastener removal aid device for removing a self-locking fastener having a pin with a head and a collar, such as a Hi-Lok® fastener, that includes at least one drill opening to receive and position a drill bit and a fastener opening for receiving at least part of the fastener. The fastener opening is designed to fit over either the collar or the pin, and the drill opening then may be centered in axial alignment with the pin, and the drill bit may then drill into either a threaded shaft end or head end of the fastener. Alternatively, the drill opening may be positioned on the sides of the fastener removal aid device to laterally break the fastener, or may also be positioned off-center to drill axially into the collar when the fastener removal aid device is positioned over the collar of the fastener and break the collar.

15 Claims, 6 Drawing Sheets

(56) References Cited

U.S. PATENT DOCUMENTS

| | | | | |
|---|---|---|---|---|
| 5,649,791 A * | 7/1997 | Connolly | ............... | B23B 47/284 |
| | | | | 408/1 R |
| 5,758,996 A * | 6/1998 | Loudon | ................... | B23B 49/02 |
| | | | | 408/104 |
| 5,820,314 A * | 10/1998 | Dunbar | ................... | B23B 47/28 |
| | | | | 408/115 B |
| 6,092,964 A * | 7/2000 | El Dessouky | ........... | B21J 15/50 |
| | | | | 408/1 R |
| 6,203,253 B1 * | 3/2001 | Perrault | ................ | B23B 47/284 |
| | | | | 408/202 |
| 6,401,573 B2 * | 6/2002 | McClure | ................... | B25B 9/00 |
| | | | | 81/52 |
| 6,824,335 B2 * | 11/2004 | Lynch | .................... | B23B 47/28 |
| | | | | 408/115 R |
| 2012/0000320 A1 * | 1/2012 | Cummings | ........... | B23B 47/284 |
| | | | | 81/53.2 |

* cited by examiner

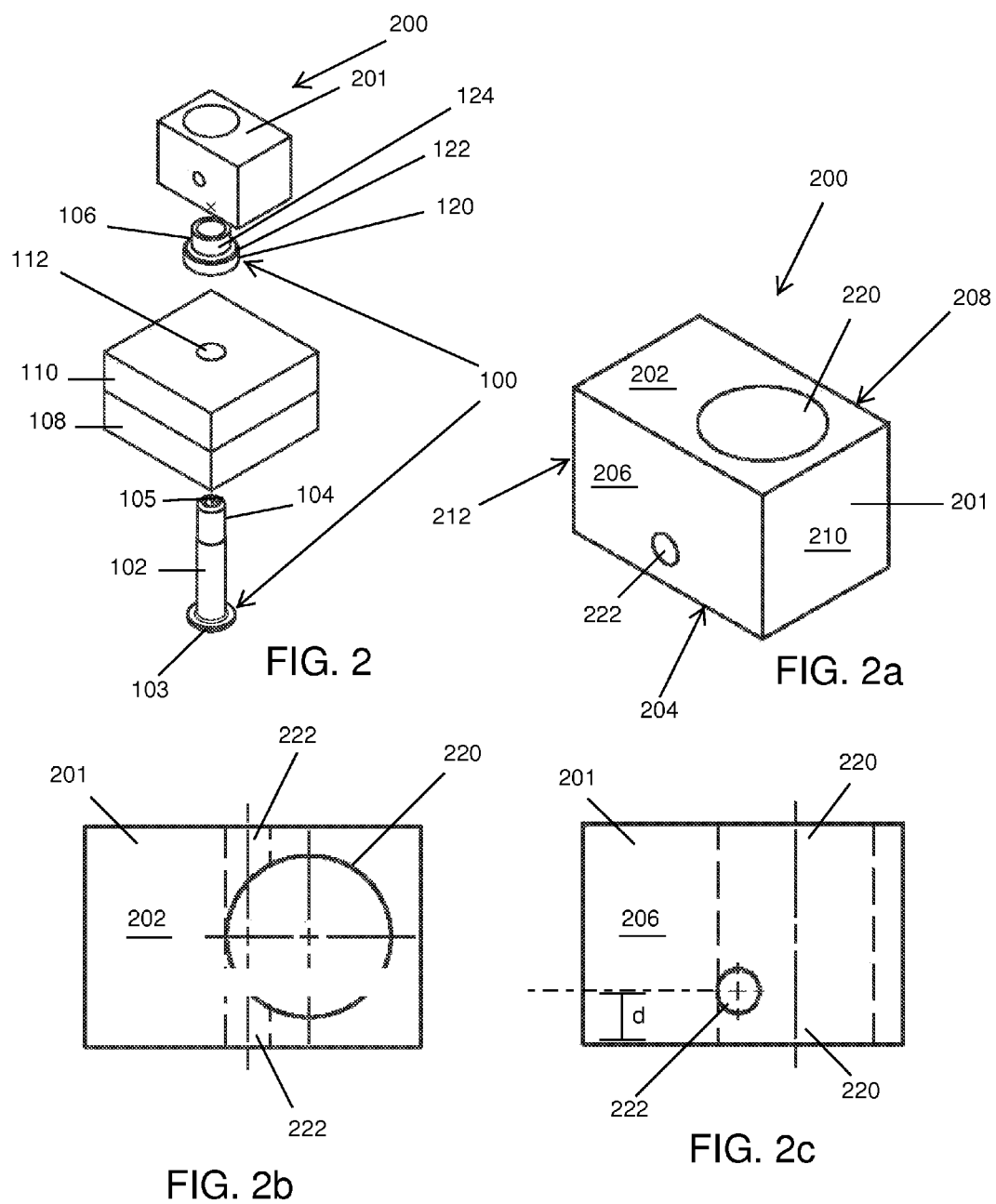

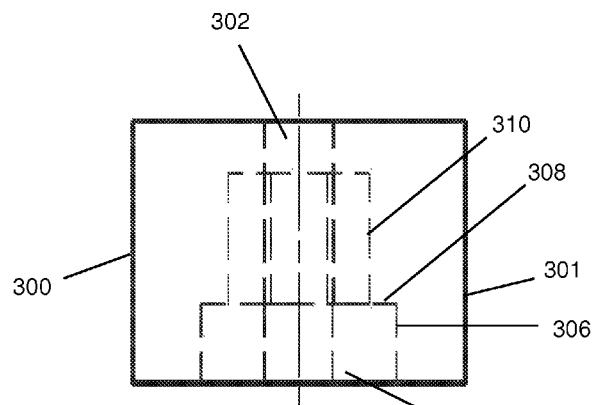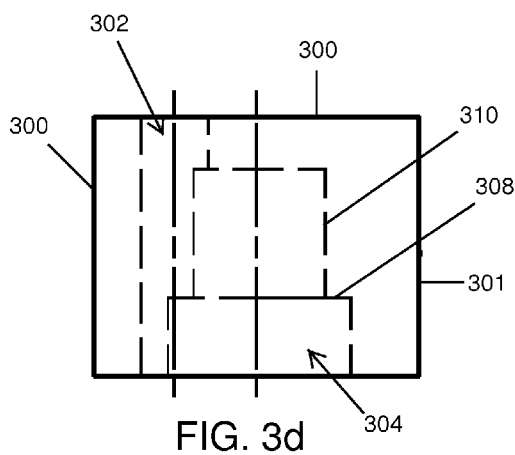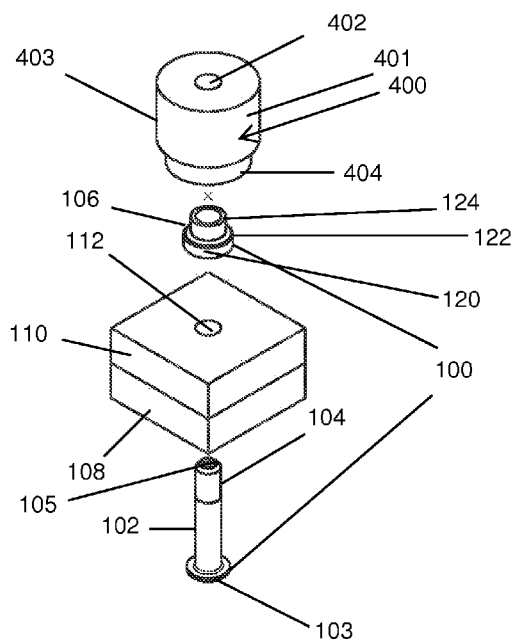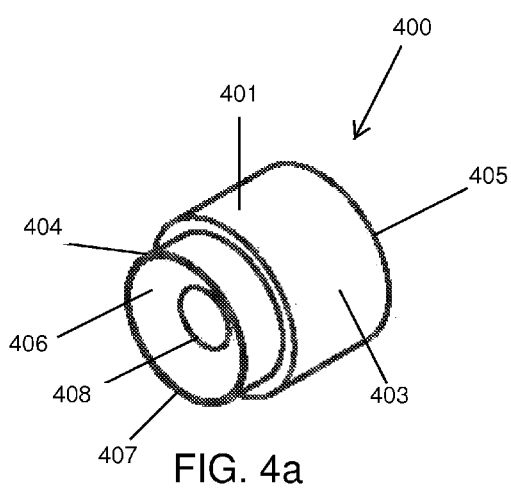

FASTENER REMOVAL AID DEVICES

STATEMENT REGARDING FEDERALLY SPONSORED RESEARCH AND DEVELOPMENT

This invention was made with government support under Contract No. W58RGZ-08-C-0098 awarded by the Department of Defense. The government has certain rights in the invention.

BACKGROUND OF THE INVENTION

1. Field of the Invention

The invention relates to fastener removal aid devices that permit efficient removal of fasteners, such as Hi-Lok® fasteners, including fasteners located in limited mobility or limited access locations.

2. State of the Art

Self-locking, permanently installed fasteners are commonly used in aerospace assembly to attach two parts. Hi-Lok® fasteners, sold by Hi-Shear Corporation, Torrance, Calif., are examples of such fasteners. As installed, Hi-Lok® fastener 100 is illustrated in FIG. 1 (Prior Art). The Hi-Lok® fastener 100 is a two-piece fastener consisting of a pin 102 having a threaded shaft 104, and a threaded collar 106. Hi-Lok® fasteners 100 are generally used for single use, high-strength, controlled, pre-load and permanent airframe assembly. Hi-Lok® fasteners 100 are made from metals and alloys such as titanium, aluminum and alloy steel and are the industry standard for high strength, permanently installed airframe fasteners.

The pin 102 of the fastener 100 is designed in two basic head styles—countersunk style and a compact protruding head style—and can accommodate both shear and tension applications. The threaded shaft 104 of the pin 102 has a hexagonal shaped recess 105 at its end opposite the head 103 to allow for one-sided installation.

The self-locking, threaded collar 106 generally includes a base portion 120 that transitions at 122 into a locking upset portion 124. The collar 106 has an internal counter-bore 114 at its base 120 to accommodate variations in material thickness. At the opposite end of the collar is a wrenching ring (not shown) that is torqued by a driving tool during installation until it shears off.

For installation, a passage 112 is drilled through the parts 108 and 110 to be fastened, which may be large sheets of metal, such as those found on aircrafts and boats. The threaded shaft 104 of the pin 102 is inserted through the aligned passages 112. The collar 106 is then hand rotated upon the threaded shaft 104 of the pin 102, the hexagonal shaped recess 105 in the pin 102 is then engaged to prevent relative rotation between the pin 102 and the structures 108, 110. Then, the collar 106 is controllably torqued with a wrench. The collar 106 is joined to a wrenching ring by a notched neck (not shown) on the collar 106 that shears from the threaded collar 106 at a predetermined torsional loading during torquing. The collar 106 provides a frictional spring lock to prevent the collar 106 from unthreading or loosening, even in environments of high vibration and stress. The torque at which the wrenching ring shears off (torque-off) determines the level of preload induced in the pin 102 and collar 106 assembly. Torque-off ranges can be selected for shear, tension and special applications.

Presently, removing self-locking, permanently installed fasteners, such as Hi-Lok® fasteners, can be cumbersome and laborious, because it can involve the removal of installed manufactured parts to access the fastener. To accomplish the removal of Hi-Lok® fasteners, manual, electric or air-motor drilling, utilizing a drill bit, are commonly employed to drill out the center of the shaft portion of the pin allowing the pin to be easily removed. Alternatively, cutting means, such as hack-saws or standard bolt cutters adapted for splitting collars, are used to cut the collars. If not done properly, the surrounding parts may become damaged, which can cause non-conformance (the reporting of which can be timely and costly). Poor fastener hole quality after removal can result, creating problems in refastening the parts using the same passages. Scars may also be left from the removal operation or consequential weakening may occur in the parts surrounding the passage, which may create premature structural fatigue failures in the surrounding structure or at the fastener holes.

Current problems with removing these self-locking, permanently installed fasteners are further compounded in areas where it is difficult to gain access to the fasteners, such as in locations where space is limited. Accordingly, the removal of self-locking fasteners without damage to the attached parts often presents a challenge.

Efforts have been made to address both the removal of the self-locking fasteners, and the speed at which these fasteners may be removed, without damage to the fastened parts. A rivet removal tool exists that is commonly available through aviation tool supply companies, such as BrownTool.com; however, this rivet removal tool is not intended for self-locking fasteners. Additionally, the rivet tool sits atop the fastener head and does not thread into a collar (i.e., a micro-stop type device) such as that used on certain self-locking fasteners. Accordingly, these types of removal tools are challenging to use in spaces, where it is difficult to maneuver.

Removing self-locking fasteners is necessary for repair and maintenance of the joined parts. For that reason, a need exists for a fastener removal aid device that facilitates the proper removal of frangible fasteners, such as Hi-Lok® fasteners. A need further exists for a removal aid that not only helps to minimize damage on the parts surrounding the fasteners, but also assists with the removal of fasteners in areas with very limited access and maneuverability.

SUMMARY

A fastener removal aid device is provided that includes at least one drill opening and a fastener opening for receiving at least part of the fastener. In this manner, the fastener opening of the fastener removal aid device fits over a portion of either the collar or the pin of the fastener. The drill opening of the removal aid device then aligns with a portion of the fastener to provide a guide for precision drilling into the correct position on the fastener. Precision drilling into the fastener facilitates the removal of the fastener with minimal damage to the surrounding parts, ensuring quality removal of the fastener. The fastener removal aid devices illustrated in this application are designed for use with Hi-Lok® fasteners; however, those skilled in the art will appreciate that the illustrated designs may be modified for use with different frangible fasteners, as well as for use with fasteners of different sizes.

The openings in the fastener removal aid devices are designed to fit over either the collar or the pin head of the fastener. Similarly, the drill openings may be positioned in axial alignment with the pin of the fastener and used to drill central holes in either the threaded shaft or head end of the pin of the fastener. When positioned to break the collar of the fastener, the drill openings may be positioned to laterally break the collar by placing one or more drill openings on the sides of the fastener removal aid devices. Alternatively, the drill openings may also be positioned to axially break the collar by positioning the drill opening off-center from the pin to drill axially into the collar when the fastener removal aid device is positioned over the collar.

Other devices, apparatus, systems, methods, features and advantages of the invention will be or will become apparent to one with skill in the art upon examination of the following Figs. and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the Figs. are not necessarily to scale, emphasis instead being placed upon illustrating the principles of the invention. In the figures, like reference numerals designate corresponding parts throughout the different views.

FIG. 2 illustrates one example of a fastener removal aid device used to laterally drill the collar of a fastener.

FIG. 2a illustrates a front perspective view of the fastener removal aid device of FIG. 2.

FIG. 2b illustrates a top view of the fastener removal aid device of FIG. 2.

FIG. 2c illustrates a side view of the fastener removal aid device of FIG. 2.

FIG. 3c illustrates a front view of the fastener removal aid device of FIG. 3 oriented in accordance with FIG. 3b.

FIG. 3d illustrates a side view of the fastener removal aid device of FIG. 3 oriented in accordance with FIG. 3b.

FIG. 4 illustrates one example of a fastener removal aid device used to assist with the drilling out of the threaded shaft portion of the pin of the fastener to loosen and remove the collar of the fastener.

FIG. 4a illustrates a rear perspective view of the fastener removal aid device of FIG. 4.

DETAILED DESCRIPTION

FIGS. 2-5 illustrate several examples of fastener removal aid devices 200, 300, 400 and 500 designed to remove self-locking fasteners 100 of a general size and shape. In the illustrated FIGS. 2b, 2c, 2d, 3b, 3c, 3d, 4b, 4c, 4d, 5b, 5c and 5d the phantom lines represent internal voids in the self-locking fasteners 100. In particular, the examples are designed to be used with and aid the removal of 3/16" inch Hi-Lok® fasteners with protruding heads. Those skilled in the art will appreciate that the illustrated designs may be modified for use with different fasteners, of different sizes and shapes, including different sized and shaped Hi-Lok® fasteners, without departing from the scope of the invention.

Figure 1:
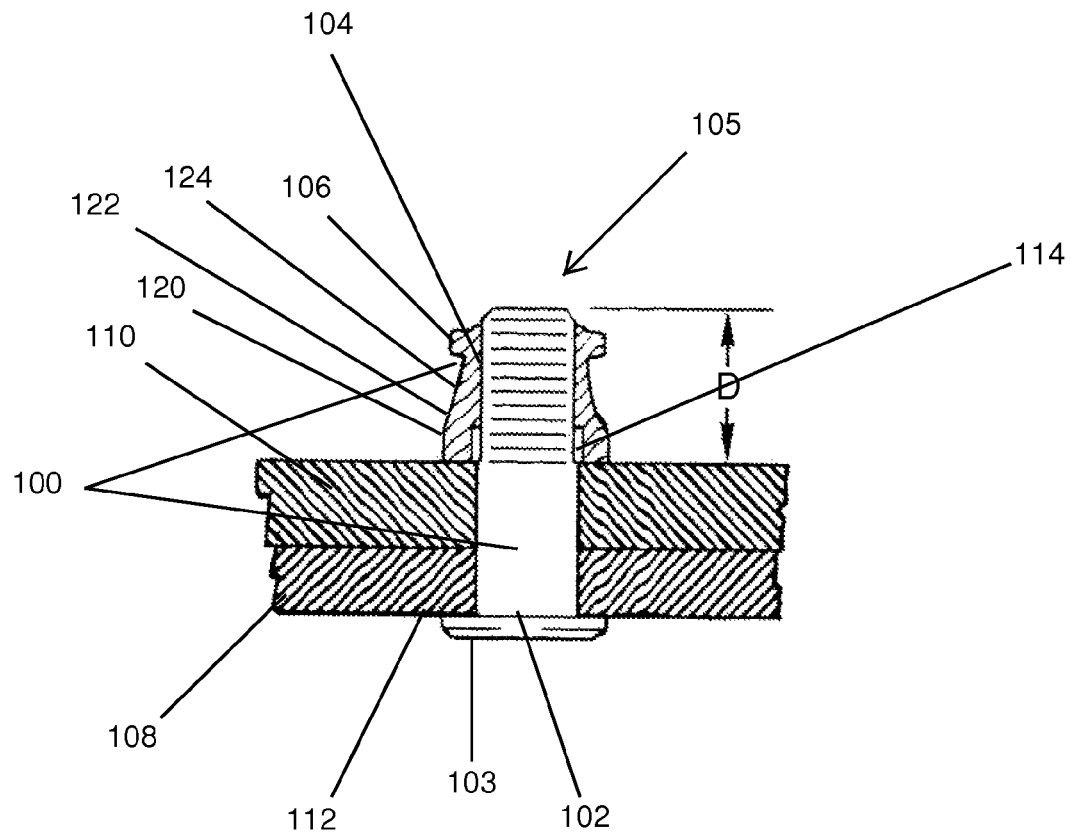
FIG. 1 (Prior Art) illustrates one example of a Hi-Lok® fastener secured to surrounding parts.

As previously noted in connection with FIG. 1 and also as illustrated FIG. 2, self-locking, permanent fasteners 100 are generally used to secure two surrounding parts 108, 110. The fastener 100 includes a collar 106 and a pin 102. The pin 102 includes a pin head 103, externally threaded shaft 104 and a hexagonal shaped recess 105 at the top of the threaded shaft 104 for receiving a hexagonal shaped wrench. The threaded shaft 104 varies in length D, depending upon the thickness of the parts, 108, 110 for which it is required to secure. The collar 106 includes a base portion 120 having an outer diameter that tapers upward and inward at 122 to a locking upset portion 124 of a smaller diameter.

As further illustrated in FIG. 1 and FIG. 2, parts 108 and 110 are fastened together by placing the threaded shaft 104 of the pin 102 through aligned openings 112 in the parts 108, 110. The collar 106 is then screwed or torqued onto the externally threaded shaft 104 of the fastener 100 to a pre-determined torqueing load that breaks the wrenching ring (not shown) from the collar 106. Once completely threaded onto the pin 102, the collar 106 leaves the locking upset portion 124 and base portion 120 of the collar 106 exposed, along with the end of the threaded shaft 104 of the pin 102, such that the hexagonal shaped recess 105 at the top of the threaded shaft 104 of the pin 102 is exposed.

Referring now specifically to FIG. 2, FIG. 2 further illustrates the use of a fastener removal aid device 200 to assist with the removal of the collar 106 from a fastener 100, such as a Hi-Lok® fastener, when the fastener 100 is secured to surrounding parts 108, 110. In this example, the fastener removal aid device 200 is used to properly align a drill bit to laterally break the collar 106 of the fastener 100.

Figure 2D:
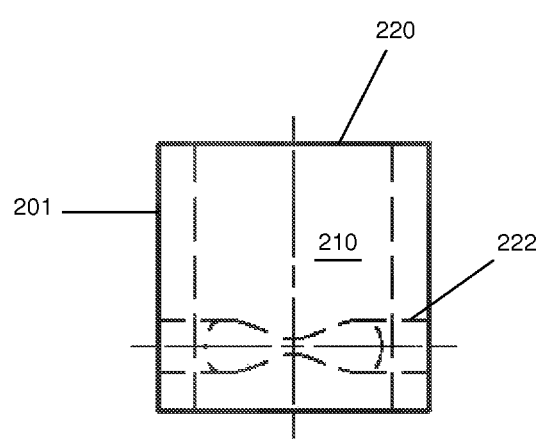
FIG. 2d illustrates a front view of the fastener removal aid device of FIG. 2.

FIGS. 2a-2d more particularly illustrate the fastener removal aid device 200. FIG. 2a illustrates a front perspective view of the fastener removal aid device 200, which is shown as a generally rectangular body 201 having opposing top and bottom surfaces 202, 204, opposing side walls 206, 208 and front and back opposing surfaces 210, 212. The fastener removal aid device 200 includes a cylindrical bore 220 that runs completely through the body 201 from the top surface 202 to the bottom surface 204. The bore 220 is sized to fit around the diameter of the base portion 120 of the collar 106 of the fastener 100. The fastener removal aid device 200 may be made available in different sizes to accommodate differently dimensioned collars 106. The bore 220 is positioned off-center to allow for room to grip the fastener removal aid device 200 on the end opposite the bore 220 without obstructing drilling when the fastener removal aid device 200 is positioned on the collar 106 of the fastener 100.

Also as illustrated in FIG. 2a, a drill hole or opening 222 is positioned through both sides 206, 208 of the fastener removal aid device 200. The drill hole 222 runs through the body 201 from one side 206 to the other side 208, in parallel with the top and bottom surfaces 202, 204 of the body 201. As illustrated in FIG. 2b, which is a top view of the fastener removal aid device 200 of FIG. 2, the central axis of the drill hole 222 runs perpendicular to the center line of the bore 220 and intersects, at its far edge, tangentially with the bore 220, such that the voids created by the bore 220 and the drill hole 222 share the same space at their points of intersection. In this regard, anything passing through the drill hole 222 from either side 206, 208 passes through the bore 220. As such, when the fastener removal aid device 200 is positioned over the collar 106, a drill bit positioned in the drill hole 222 is placed in contact with the collar 106 of the fastener 100.

FIG. 2c illustrates a side view of the fastener removal aid device 200 of FIG. 2. As illustrated in FIG. 2, the drill hole 222 is positioned off center near the bottom surface 204 of the fastener removal aid device 200. The width of the body 201 (i.e. length between opposing sides 206, 208) in this example is approximately 0.50 inches. In the illustrated example, the drill hole 222 is centered approximately 0.12 inches from the bottom surface 204 of the fastener removal aid device 200 (d=0.12) and approximately 0.22 inches from the top surface 202 of the fastener removal aid device 200. Further, in this example, the drill hole 222 is sized to receive a #40 drill bit (0.098 in.). Other dimensions of the body 201, drill hole 222 and the distance of the drill hole 222 from the bottom surface 204 and to surface 202, may be scaled for use with other sized and type fasteners.

FIG. 2d illustrates a front view of the fastener removal aid device 200 of FIG. 2, which illustrates the bore 220 and the drill hole 222 passing entirely thought the fastener removal aid device 200 from top to bottom 202, 204 and side to side 206, 208, respectively.

As noted above, in the illustrated example, the width of the fastener removal aid device 200 from opposing side 206 to opposing side 208 is 0.50 inches. The height of the fastener removal aid device 200 from the top surface 202 to the bottom surface 204 is 0.34 inches. The length of the fastener removal aid device 200 from the front surface to back surface is 0.75 inches. The drill hole is centered 0.12 inches from the bottom side 204 of the fastener removal aid device 200 (d=0.12) and 0.385 inches from the front side 210 of the fastener removal aid device 200. The drill hole is 0.10 inches in diameter. The bore 220 is approximately 0.366 inches in diameter and is centered along the width of the body 201 0.25 inches from the front surface 210.

In operation, the fastener removal aid device 200 is placed on the collar 106 of the fastener 100 and held firmly in place by hand. Because the bore 220 is sized to fit around the diameter of the base portion 120 of the collar 106, the fastener removal aid device 200 will completely receive the collar 106 such that the fastener removal aid device 200 may rest on the top surface of part 110 when placed over the collar 106. In this example, the operator may then use a drill bit, for example a #40 (0.098 inches), to drill through the drill hole 222 in the fastener removal aid device 200 into the side of the collar 106. Since the drill hole 222 is positioned 0.12 inches from the bottom surface 204 of the fastener removal aid device 200, the operator will be drilling at approximately 0.12 inches away from the bottom of the collar 106 positioned against part 110. During drilling, the operator may remove the drill bit and visually inspect the collar 106 to ensure the fastener removal aid device 200 is properly guiding the drill bit through the collar 106.

The fastener removal aid device 200 collar is then inverted (or turned upside down) and positioned over the collar 106 such that the drill hole is now located slightly above the previous point at which the collar 106 was drilled. In the current example, when the fastener removal aid device 200 is inverted and positioned over the collar 106, the drill hole 222 will be positioned 0.12 inches from the top side of the part 110. The operator will now be drilling at 0.22 inches away from the bottom of the collar 106 positioned against part 110.

Again, the fastener removal aid device 200, in its inverted position, is held firmly in place by hand. The operator again uses a #40 drill bit (0.098 in.) to drill through the drill hole 222 and into the collar 106. This time, the operator will be drilling through the side of the collar 106 at a slightly higher point along the collar 106. Again, the operator may remove the drill bit and visually inspect the collar 106 to ensure the fastener removal aid device 200 is property guiding the drill bit through the collar 106. Once drilling in both locations along the collar 106 is complete, resulting in one drilled hole in the collar 106 positioned slightly above the other, the operator should be able to remove the collar 106 and remove the pin 102 from the fastener 100.

Figure 3:
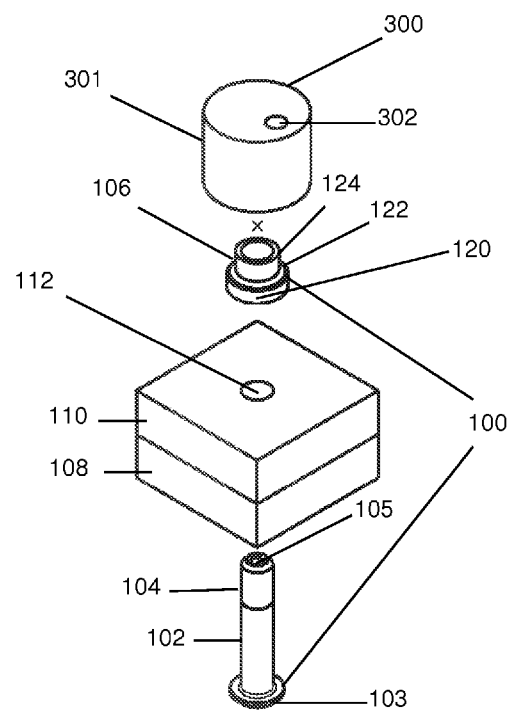
FIG. 3 illustrates one example of a fastener removal aid device used to axially drill the collar of a fastener.

Referring now to FIG. 3, FIG. 3 illustrates another example of a removal aid 300. The removal aid 300 is used in this example to assist with axially removing the collar 106 of a fastener 100, such as a Hi-Lok® fastener, when the fastener 100 is secured to surrounding parts 108, 110. In this example, the fastener removal aid device 300 is used to properly align a drill bit to axially drill the collar 106 of the fastener 100.

Figure 3A:
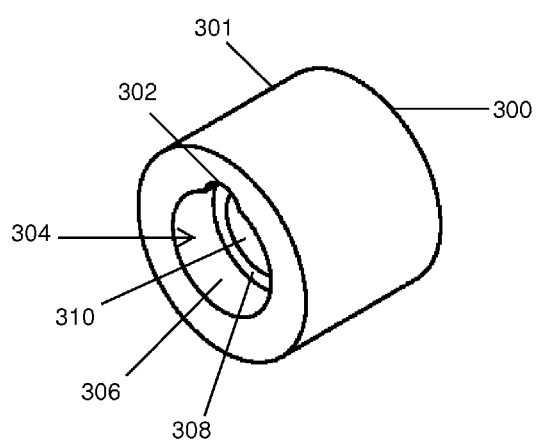
FIG. 3a illustrates a rear perspective view of the fastener removal aid device of FIG. 3.

FIGS. 3a-3d more particularly illustrate the fastener removal aid device 300. FIG. 3a illustrates a rear perspective view of the fastener removal aid device 300, which is a generally cylindrical body 301 having a drill hole or opening 302 that runs completely through the body 301 from the top surface to the bottom surface of the body 301. The cylindrical body 301, at its bottom, further includes a tiered opening 304 sized to receive the collar 106 of the fastener 100. The tiered opening 304 includes a first cylindrical opening 306 of a diameter necessary to receive the base portion 120 of the collar 106. The first cylindrical opening 306 then transitions at 308 into a smaller diameter cylindrical interior opening 310 of a diameter necessary to the receive the locking upset portion 124 of the collar 106.

Figure 3B:
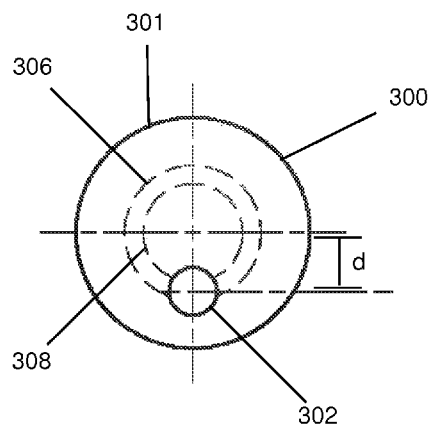
FIG. 3b illustrates a top view of the fastener removal aid device of FIG. 3.

FIG. 3b illustrates a top view of the fastener removal aid device 300 of FIG. 3. As illustrated in FIG. 3b, the central axis of the drill hole 302 is aligned in parallel with the tiered opening 304 but is positioned off-center from the tiered opening 304 such that the drill-hole aligns with the collar 106, avoiding the pin 102 of the fastener 100 within the center of the collar 106. In particular, in this example, the center of the drill hole is positioned at distance of 0.159 inches off-center.

FIG. 3c illustrates a front view of the fastener removal aid device 300 of FIG. 3 oriented in accordance with FIG. 3b. FIG. 3c illustrates the central axis of the drill hole 302 running in-line with the central axis of the tiered opening 304, when viewed with the drill hole 302 positioned in the front. Whereas, FIG. 3d illustrates a side view of the fastener removal aid device 300 of FIG. 3 oriented in accordance with FIG. 3b. FIG. 3d illustrates the central axis of the drilling hole 302 running parallel with, but off-center from, the central axis of the tiered opening 304. FIGS. 3c and 3d also illustrate that the tiered opening 304 does not extend the entire length of the fastener removal aid device 300, but stops before it reaches the top, only exposing drill hole 302 opening at the top of the fastener removal aid device 300. In this manner, the tiered opening 304 avoids interfering with the initial alignment of the drill with the drill hole 302.

In the illustrated example, the diameter of the fastener removal aid device 300 is 0.625 inches. The height of the fastener removal aid device is 0.50 inches. The drill hole 302 is positioned 0.159 inches off-center and has a 0.129 inch diameter. With respect to the tiered opening 304, the first cylindrical opening 306 is 0.365 inches in diameter and is centered along the central axis of the fastener removal aid device 300. The smaller diameter cylindrical interior opening 310 is 0.266 inches in diameter and is also centered about the central axis of the fastener removal aid device 300. The first cylindrical opening 306 is 0.150 inches tall, and the smaller cylindrical interior opening 310 extends upward from the first cylindrical opening 306 0.25 inches, making the total height of the tiered opening 304 0.400 inches, terminating 0.100 inch short of the top surface of the fastener removal aid device 300.

In operation, the fastener removal aid device 300 is placed on the collar 106 of the fastener 100 and held firmly in place by hand. The operator uses a tool, such as a drill bit, and for example, a #30 drill bit (0.1285 inches), to drill 0.15 to 0.17 inches deep into the collar 106. This will loosen the collar 106 enabling it to be separated from the fastener pin 102, and thus allow the pin 102 to be removed.

FIG. 4 illustrates another example of a fastener removal aid device 400 used to assist with the drilling out of the top of the threaded shaft 104 of the fastener 100 from the collar 106. The fastener removal aid device 400 is used to properly align a drill bit to axially drill into the top of the threaded shaft 104 of the fastener 100. In this example, the fastener removal aid device 400 is a generally cylindrical body 401 having a central drill hole or opening 402 that runs completely through the body 401 from the top surface to the bottom surface. The body 401 further includes a main cylindrical portion 403 and a lower cylindrical portion 404 extending from the lower edge of main cylindrical body 403 and adapted to receive the collar 106 of the fastener 100.

Figure 4B:
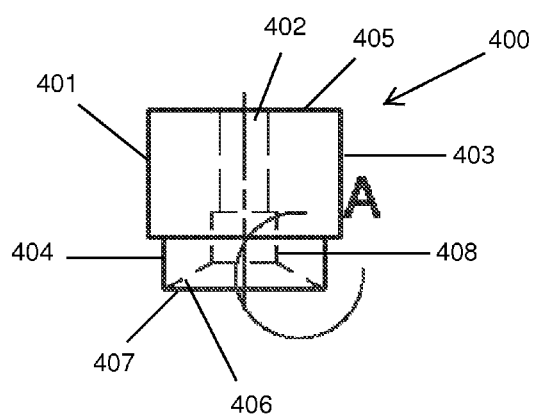
FIG. 4b illustrates a side view of the fastener removal aid device of FIG. 4.

FIGS. 4a-4d further illustrate the fastener removal aid device 400. FIG. 4a illustrates a rear perspective view of the fastener removal aid device 400, which, as previously described is a generally cylindrical body 401 having main and lower cylindrical portions 403 and 404 respective. A drill hole 402 runs completely through the body 401 from the top surface XX to the bottom surface XX of the body 201. The lower cylindrical portion 404 of the body 401 includes a transitioned opening 406. The transitioned opening 406 is an angled opening that transitions into an interior cylindrical opening 408, which together, are sized to receive the top tapered portion 122 (FIG. 1) of the collar 106 of the fastener 100. The transitioned opening 406 is designed to interface with the tapered portion 122 of the collar 106. The interior cylindrical opening 408 is designed to receive the locking upset portion 124 of the collar 106.

Figure 4C:
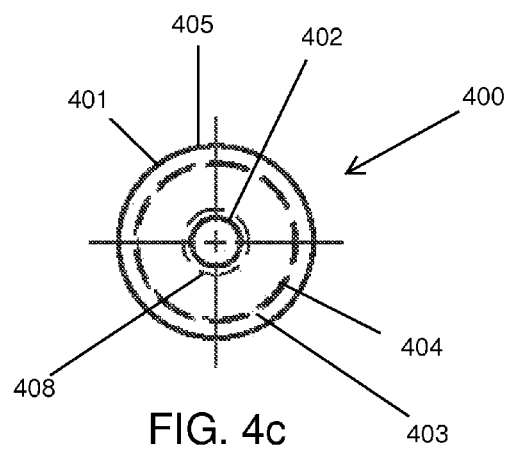
FIG. 4c illustrates a top view of the fastener removal aid device of FIG. 4.

FIG. 4b illustrates a side view of the fastener removal aid device 400 of FIG. 4. As illustrated, the drill hole 402 runs entirely through the fastener removal aid device 400 from top to bottom. The lower cylindrical portion 404 of the body 401 has a transitional opening 406 that meets an interior cylindrical opening 408 sized to receive the locking upset portion 124 of the collar 106. FIG. 4c is a top view of the fastener removal aid device 400 of FIG. 4 and best illustrates the drill hole 402 running through the fastener removal aid device 400.

Figure 4D:
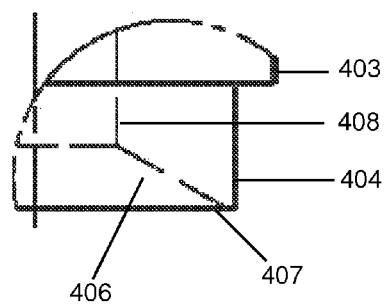
FIG. 4d illustrates a detail view of the fastener removal aid device of FIG. 4 at location A of FIG. 4b.

FIG. 4d illustrates a side detail view of the fastener removal aid device 400 at location A of FIG. 4b. FIG. 4d best illustrates the angled transitional opening 406 commencing at the bottom edge of the lower cylindrical portion 404 of the fastener removal aid device 400 and angling inward and upward toward the base of the interior cylindrical opening 408. In the illustrated example, the diameter of the main cylindrical portion 403 of the fastener removal aid device 300 is 0.75 inches and the diameter of the lower cylindrical portion 404 is 0.63 inches. The drill hole 402 is 0.129 inches in diameter and centered along the vertical axis of the fastener removal aid device 400. The interior cylindrical opening 408 is also centered along the vertical axis of the fastener removal aid device 400 and is 0.256 inches in diameter.

The total height of the fastener removal aid device 400 is 0.700 inches, where the lower cylindrical portion 404 is 0.20 inches in height and the main cylindrical portion 403 is 0.50 inches in height. The initial diameter of the transitional opening (at its widest point) is 0.63 inches. The transitional opening 406 from it lower edge to where it intersects the interior cylindrical opening 408 is approximately 0.10 inches high, making the angle of the transitional opening 120 degrees. The interior cylindrical opening 408 is 0.2 inches high. As such, the opening for the collar 106 from the commencement of the transitional opening 406 to the termination of the interior cylindrical opening 408 within the fastener removal aid device 400 is 0.300 inches in height.

To fully facilitate the removal of the fastener 100, a second, nearly identical, fastener removal aid device 400 is utilized to assist in drilling out the threaded shaft 104 of the pin 102 from the collar 106. This second removal aid 400 is identical in all respects to the above described fastener removal aid device 400, except that the drill hole 402 is 0.191 inches in diameter, rather than 0.129 inches in diameter.

In operation, the fastener removal aid device 400 is placed on the collar 106 and held firmly in place by hand. The operator then uses a drill bit, for example, a #30 drill bit (0.1285 in.) to drill 0.20 inches deep into the threaded end 104 of the pin 102 of the fastener 100. The operator then removes the drill bit and visually inspects the fastener head ensuring that the hole is centered. The second fastener removal aid device 400 of the larger diameter (0.191 inch diameter drill hole) is then placed on the collar 106 and again, held firmly in place by hand. Next, the operator uses a 0.190 inch drill bit to drill 0.20 inches into the threaded end 104 of the pin 102 of the fastener 100. At this stage, the collar 106 should now be loose enough to remove and then, once removed, the pin 102 of the fastener 100 can be removed.

Figure 5:
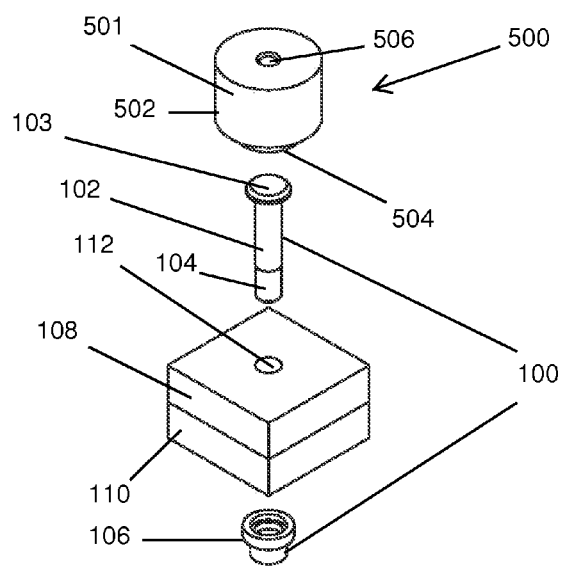
FIG. 5 illustrates one example of a fastener removal aid device used to remove the protruding head of the fastener.

FIG. 5 illustrates one example of a fastener removal aid device 500 utilized to facilitate the drilling out of the head 103 of the pin 102 of the fastener 100. The fastener removal aid device 500 is used to properly align a drill bit to axially drill into the head 103 of the pin 102 of the fastener 100. Similar to the fastener removal aid device 400 of FIG. 4, the fastener removal aid device 500 is a generally cylindrical body 501 having a central drill hole or opening 506 that runs completely through the body 501 from the top surface to the bottom surface. The body 501 further includes a main cylindrical portion 502 and a lower cylindrical portion 504 extending from the lower edge of main cylindrical portion 502. The lower cylindrical portion 504 being adapted to receive the head 103 of the pin 102 of the fastener 100.

Figure 5A:
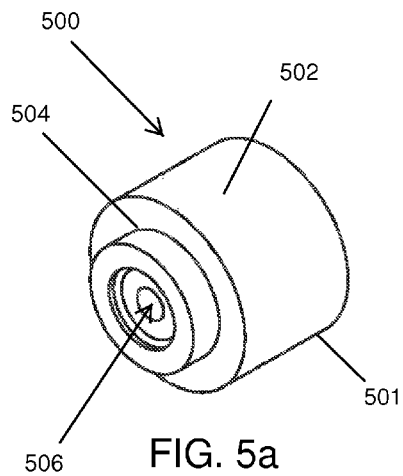
FIG. 5a illustrates a rear perspective view of the fastener removal aid device of FIG. 5.

FIGS. 5a-5d further illustrate the fastener removal aid device 500. FIG. 5a illustrates a rear perspective view of the fastener removal aid device 500, which, as previously described, is a generally cylindrical body 501 having main and lower cylindrical portions 502 and 504, respective. A drill hole 506 runs completely through the body 501 from the top surface 505 to the bottom surface 507 of the body 501.

Figure 5B:
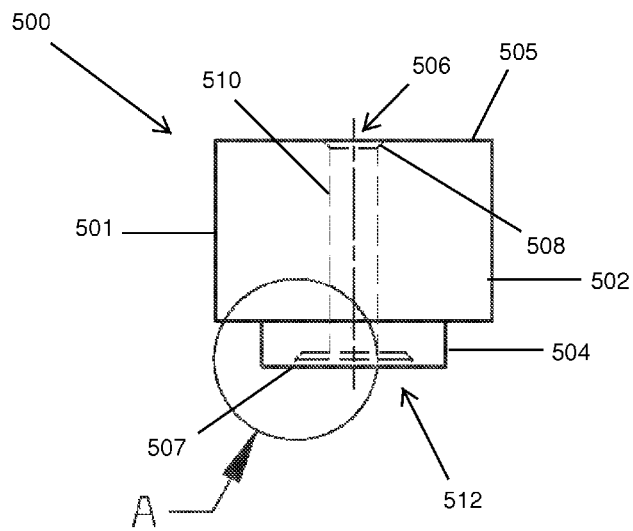
FIG. 5b illustrates a side view of the fastener removal aid device of FIG. 5.

FIG. 5b illustrates a side view of the fastener removal aid device 500 of FIG. 5. The lower cylindrical portion 504 of the body 501 includes an opening 512 that profiles a protruding head 103 of a pin 102 of a fastener 100. The opening 512 of the lower cylindrical portion 504 includes a base opening 514 and a transitioned angled opening 516 that terminates at a planar surface 518. The planar surface 518 intersects with the edge 510 of the drill hole 506. The opening 512 is designed to receive the head 103 of the pin 102 of a fastener 100.

As further illustrated in FIG. 5b, the drill hole 506 on the top surface of the fastener 500 has a transitioned opening 508 that converges inward to intersect with the sides 510 of the drill hole 506.

Figure 5C:
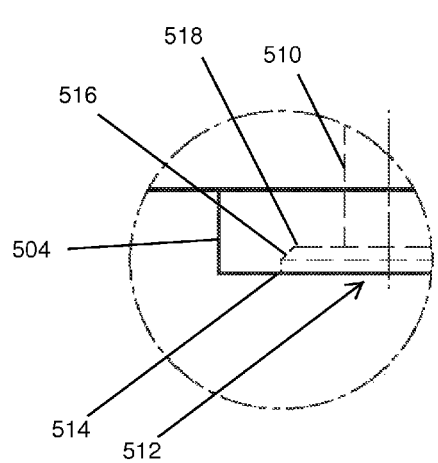
FIG. 5c illustrates a detail view of the fastener removal aid device of FIG. 5 at location A of FIG. 5b.

FIG. 5c illustrates a side detail view of the fastener removal aid device 500 of FIG. 5 at location A of FIG. 5b. FIG. 5c best illustrates the opening 512 of the lower cylindrical portion 504. As describe above, the opening 512 includes a base opening 514 and a transitioned angled opening 516 that terminate at a planar surface 518. The planar surface 518 intersects with the side walls 510 of the drill hole 506. The opening 512 is 0.04 inches in height. The base opening 514 is 0.02 inches of the 0.04 inches of the opening 512.

Figure 5D:
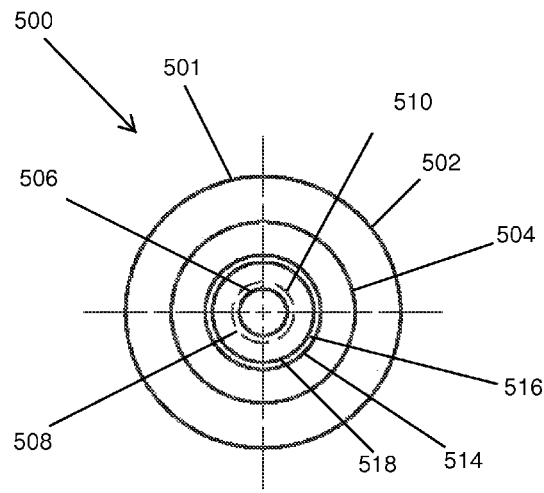
FIG. 5d illustrates a bottom view of the fastener removal aid device of FIG. 5.

FIG. 5d is a rear view of the fastener removal aid device 500 of FIG. 5. FIG. 5d best shows the relative diameters of the various openings in the fastener removal aid device 500. In one example of the fastener removal aid device 500, the main cylindrical portion 502 has a diameter of 0.75 inches. The lower cylindrical portion has a diameter of 0.50 inches. The base opening has a diameter of 0.316 inches. The height of the removal aid is 0.625 inches, with the lower cylindrical portion representing 0.125 inches of the overall height.

In this example, to fully facilitate the removal of the head 103 of the pin 102 of the fastener, two nearly identical fastener removal aid devices 500 with two different drill hole diameters are used to drill the holes in the head 103 of the pin 102. The two fastener removal aid devices 500 are identical in all respects, as described above, except that one fastener removal aid device 500 has a drill hole having a smaller diameter of 0.129 inches (small diameter fastener removal aid device 500) and the other has a drill hole having a larger diameter of 0.189 inches (larger diameter fastener removal aid device 500).

In operation, the small diameter fastener removal aid device 500 is first placed on the head 103 of the pin 102 and held firmly in place by hand. The operator then uses a drill bit, for example, a #30 drill bit (0.128 in.), to drill 0.05 to 0.06 inches into the head 103 of the pin 102. This hole provides a pilot hole for the next larger hole. The operator removes the drill bit and visually inspects the fastener head 103 to ensure the hole is centered. The larger diameter fastener removal aid device 500 is then placed on the fastener head 103 and held firmly in place by hand. The operator then uses a non-standard 0.186 inch drill bit to drill 0.05 to 0.06 inches deep into the head 103 of the pin 102. The operator removes the drill bit and then removes the head 103 of the pin 102 of the fastener 500. The threaded shaft 104, with the collar 106 still attached, can now be carefully knocked out.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

In particular, and as noted above, the fastener removal aid devices illustrated in this application are design for use with standard self-locking fasteners such as Hi-Lok®; however, those skilled in the art will appreciate that the illustrated designs may be modified for use with different fasteners, as well as for use with Hi-Lok® fasteners of different sizes, Hi-Lite® fasteners and Hi-Tigue® fasteners (also sold by Hi-Shear Corporation, Torrance, Calif.).

Further, modifications to the overall size and shape of the fastener removal aid devices illustrated in FIGS. 2-5 are possible. Features of the fastener removal aid devices in FIGS. 2-5 may also be modified or combined without departing from the scope of the invention. For example, as first noted above, the illustrated examples are designed for use with 3/16" Hi-Lok® Fasteners. All the holes for receiving the fastener parts are dimensioned to be 0.001 inches larger than the parts of the Hi-Lok® Fasteners for which they are intended to receive. Accordingly, these dimensions, as well as the body 201 size of the fastener removal aid devices, can be scaled by the same proportions to fit different sized standard self-locking fasteners and different sized Hi-Lok® Fasteners. Further, the dimensions of the drill holes may also be modified to be larger or smaller, in which case, differing sized drill bits, other than the examples, set forth above, may be utilized to drill through the openings. For example, if it is desired to break a larger fastener, the fastener removal aid devices illustrated in the application may be scaled to be larger, including a larger drill hole to assisting in breaking the larger fastener. Similarly, if it is desired to break a smaller fastener, the fastener removal aid devices illustrated in the application may be scaled to be smaller, including a smaller drill hole to assisting in breaking the smaller fastener.

What is claimed is:

1. A fastener removal aid device for removing a frangible, self-locking fastener securing parts, the fastener removal aid device comprising:
    a body having at least one drill opening to receive and position a drill bit and at least one additional fastener opening sized to receive a portion of a self-locking fastener having a pin having a head and an externally threaded shaft, and a collar configured to be torqued onto the externally threaded shaft, where the at least one drill opening is positioned to axially align a drill bit with the collar of the self-locking fastener when the body is positioned on either an end of the self-locking fastener with the head or an end of the self-locking fastener with the collar,
    whereby the at least one drill opening is positioned off-center from a central axis of the at least one additional fastener opening such that the pin is avoided when drilling the collar through the drill opening of the body with the drill bit so as to loosen the collar to enable its separation from the pin.

2. The fastener removal aid device of claim 1, where the self-locking fastener is a Hi-Lok® fastener.

3. The fastener removal aid device of claim 1, where the at least one additional fastener opening is sized to receive at least a portion of the collar.

4. The fastener removal aid device of claim 3, wherein the body of the fastener removal aid device has a tiered opening at a bottom of the body to receive the collar, where the tiered opening includes a first cylindrical opening of a diameter to receive a base portion of the collar.

5. The fastener removal aid device of claim 4, wherein the first cylindrical opening transitions into a smaller diameter cylindrical interior opening of a diameter necessary to receive a base portion of the collar.

6. The fastener removal aid device of claim 1, where the at least one additional fastener opening is sized to receive the head of the pin.

7. A fastener removal aid device for assisting with the removal of a frangible, self-locking fastener having a pin having a head and an externally threaded shaft, and a collar configured to be torqued onto the externally threaded shaft, the fastener removal aid device comprising:
a body having at least one drill opening positioned axially along a central axis of the body and at least one additional fastener opening sized to receive a portion of the self-locking fastener, where the at least one drill opening is positioned to axially align with the pin of the self-locking fastener when the body is positioned on either an end of the self-locking fastener with the head or an end of the self-locking fastener with the collar, and the at least one additional fastener opening is off-center from a central axis of the at least one additional fastener opening such that the pin is avoided when drilling the collar so as to loosen the collar to enable its separation from the pin.

8. The fastener removal aid device of claim 7, where the self-locking fastener is a Hi-Lok® fastener.

9. The fastener removal aid device of claim 7, where the at least one additional fastener opening is sized to receive at least a portion of the collar.

10. The fastener removal aid device of claim 9, where the at least one additional fastener opening is sized to receive the head of the pin.

11. A fastener removal aid device for assisting with the removal of a frangible, self-locking fastener having a pin having a head and an externally threaded shaft, and a collar configured to be torqued onto the externally threaded shaft, the fastener removal aid device comprising:
a body having at least one drill opening positioned along the body and at least one additional fastener opening sized to receive the collar of the fastener, where the at least one drill opening is positioned to axially align with the collar of the self-locking fastener when the body is positioned on the self-locking fastener,
whereby the at least one drill opening is positioned off-center from a central axis of the at least one additional fastener opening such that the pin is avoided when drilling the collar.

12. The fastener removal aid device of claim 11, where the self-locking fastener is a Hi-Lok® fastener.

13. The fastener removal aid device of claim 11, where the drill opening is positioned to align in parallel with the collar of the self-locking fastener to facilitate axially drilling into the collar of the fastener.

14. A method for removing a frangible, self-locking fastener having a pin having a head and an externally threaded shaft and a collar configured to be torqued over the externally threaded shaft, that secures two surrounding parts, the method comprising:
positioning a fastener removal aid device on either an end of the self-locking fastener with the head or an end of the self-locking fastener with the collar, the fastener removal aid device having an opening sized to receive at least a portion of the self-locking fastener securing the two surrounding parts, where the fastener removal aid device further includes a body having at least one drill opening sized to receive a drill bit and align the drill bit with the received portion of the self-locking fastener securing the two surrounding parts; and
drilling through the at least one drill opening with a drill bit to remove a portion of the collar of the self-locking fastener, whereby the at least one drill opening is positioned off-center from a central axis of the received portion of the self-locking fastener opening such that the removed portion of the self-locking fastener is entirely from the collar.

15. The method of claim 14, wherein the body of the fastener removal aid device has a tiered opening at a bottom of the body to receive the collar, where the tiered opening includes a first cylindrical opening of a diameter to receive a portion of the collar, and the first cylindrical opening transitions into a smaller diameter cylindrical interior opening of a diameter necessary to receive a base portion of the collar.

* * * * *